United States Patent [19]

Blount

[11] 4,089,840

[45] May 16, 1978

[54] PROCESS FOR THE PRODUCTION OF EPOXY SILICATE RESINOUS PRODUCTS

[76] Inventor: David H. Blount, 5450 Lea St., San Diego, Calif. 92105

[21] Appl. No.: 808,818

[22] Filed: Jun. 22, 1977

Related U.S. Application Data

[63] Continuation-in-part of Ser. No. 678,196, Apr. 19, 1976, Pat. No. 4,036,787.

[51] Int. Cl.$^2$ ............................................. C08G 77/04

[52] U.S. Cl. ......................... 260/46.5 R; 260/448.2 R; 260/448.8 R

[58] Field of Search .................................... 260/46.5 R

[56] References Cited

U.S. PATENT DOCUMENTS 4,028,391  6/1977  Foley ...................... 260/46.5 R UX Primary Examiner—Paul F. Shaver

[57] ABSTRACT

Silica and epoxy compounds are reacted chemically to produce epoxy silicate resinous products, when mixed together in the presence of a suitable catalyst.

16 Claims, No Drawings

PROCESS FOR THE PRODUCTION OF EPOXY SILICATE RESINOUS PRODUCTS

CROSS-REFERENCE TO RELATED APPLICATIONS

This Application is a continuation-in-part of may earlier U.S. Patent Application No. 678,196 filed Apr. 19, 1976, now U.S. Pat. No. 4,036,787.

BACKGROUND OF THE INVENTION

This invention relates to the production of resinous products produced by the chemical reaction of a silica with an epoxy compound in the presence of a suitable catalyst. The product produced by this invention will be referred to as epoxy silicate resinous products for the purposes of this Application.

The silica ($SiO_2$) used in this Application may be produced by any of the commonly known methods. It is preferred that the silica by in the form of fine granules or powder.

While a wide variety of epoxy compounds and resins have been produced for a number of diverse applications, none have the unique properties possessed by the compounds of this invention. Epoxy silicate resinous products may be used as molding materials, in casting applications, as coating agents on wood and metals, in dispersions, as adhesives, as fillers, as prepolymers, as impregnates, in rubber-like materials and may be copolymerized with other reactants. They may be used in the production of further compounds.

An example of the use of the epoxy silicate resin as a coating agent may be outlined as follows:
 (a) about 1 part by weight of ethylene diamine, about 1 part by weight of castor oil and about 2 parts by weight of a fine granular silica are heated to about 150° C for 20 to 30 minutes while agitating;
 (b) epichlorohydrin is slowly added while agitating and keeping the temperature below 100°C until about 2 parts by weight of epichlorohydrin are used, thereby producing a thick liquid epoxy silicate resin;
 (c) add about 1 part by weight of Bisphenol A epoxy resin and mix well;
 (d) paint the mixture on wood, thereby producing a hard, tough, protective coating in 2 to 6 hours.

SUMMARY OF THE INVENTION

I have discovered that silica ($SiO_2$), when mixed in appropriate proportions with a suitable epoxy compound and a suitable catalyst, will react chemically to produce an epoxy silicate polymer. This basic process may be varied to produce products having varied properties. The proportions of silica, catalysts, and epoxy compounds may be varied, for example, to produce a polymer, ranging from a liquid to a soft solid, to a rubbery solid and to a very hard solid.

The reactants may be mixed in any suitable proportions, depending upon the product characteristic desired. Generally, from about 0.5 to about 3 mols of the epoxy compound are mixed with each mol of silica ($SiO_2$). A catalytically effective amount of the selected catalyst is used. Generally, depending upon the catalyst selected and the reaction conditions desired, where the catalyst, such as some amines, also enters into the reaction, a larger quantity may be desirable. In most cases, from about 0.02 to 2 catalyst per part silica will give good results.

In one preferred embodiment of this invention a polymer having excellent properties in produced by mixing silica and a suitable amine catalyst, then adding the epoxy compound in steps of about 10 to 20 percent of the total, keeping the temperature below 100° C and allowing the reaction to be completed by each step before additional epoxy compound is added. Generally, with agitation, only a few minutes need be allowed between addition of steps.

Any suitable epoxy compound may be used in this process. Typical epoxy compounds include epichlorohydrin, glycidol, methyl epichlorohydrin, 1,2-epoxybutane, 1,2-epoxycyclohexane, epoxyethane, 1,2-epoxypropane, 1-chloro-2,3-epoxypropane, 1:2, 3:4-diepoxybutane, 2:3, 6:7-diepoxy-2,6-dimethyl -4-octene, epoxyethylbenzene and mixtures thereof. Of these, best results are obtained with epichlorohydrin which is therefor, the preferred epoxy compound.

Any suitable epoxidized polyhydroxy compounds may be used in this process. The epoxides of polyhydroxy compounds are produced by chemically reacting a peroxy acid such as peroxyacetic acid, peroxybenzoic acid and peroxyacid produced by oxidizing organic aldehydes.

Any suitable epoxidized oils may be used in this process. The epoxidized oils are produced by chemically reacting peroxy acids with unsaturated vegetable oils such as castor oil.

Any suitable epoxidized unsaturated organic compound may be used in this process. The epoxidized unsaturated organic compounds are produced by the chemical reaction of olefin compound with peroxy acid compounds to produce epoxy compounds by epoxidation.

Any suitable epoxidized polyhydroxy compounds produced by the chemical reaction of epichlorohydrin with a polyhydroxy compound may be used in this process.

Any suitable epoxidized unsaturated fatty acid may be used in this process. The unsaturated fatty acids may be chemically reacted with epichlorohydrin or a peroxy acid compound to produce the epoxidized unsaturated fatty acid.

Best results are obtained when the epoxidized unsaturated organic compounds, epoxidized polyhydroxy compounds, epoxidized fatty acids, Phenoxy resins, and epoxidized vegetable oils are used with epichlorohydrin in the production of epoxy silicate resins. The ratio of the parts by weight of epoxidized compounds to the parts by weight of epichlorohydrin may be quite varied, ranging from 2 to 1 up to 1 to 2. The epoxidized compound or resin should have 2 or more reactive epoxy groups per molecule for the purpose of this invention.

Any of the epoxy resins may be used which contain 2 or more reactive epoxy groups per molecule such as that produced by reacting epichlorohydrin with bisphenol A and diglycidyl ether of bisphenol. The epoxy resins with 2 or more reactive epoxy groups per molecule are obtained by condensing epichlorohydrin with a suitable dihydroxy organic compound. Best results are obtained when using bisphenol-A [2,2-(4-bis-hydroxyphenyl)-propane], and this is considered to be the preferred hydroxy compound. Other hydroxy containing compounds, such as resorcinol, hydroquinone glycols, glycerol and mixtures thereof may be used in mixtures with or in lieu of the hydroxy alkanes if desired. Any suitable di(mono-hydoxy) alkane may be used in this invention. Typical alkanes are: (4,4'-dihydroxydiphenyl)-methane, 2,2-(4 bis-hydroxy phenyl)-propane, 1,1-(4,4'-dihydroxy-diphenyl) cyclohexane, 1,1-(4,4'-dihydroxy-3,3'-dimethyl-diphenyl) cyclohenane, 1,1-(2,2'-dihydroxy-4,4'-dimethyldiphenyl)-butane, 2,2-(2,2'-dihydroxy-4,4'-di-tert-butyl-diphenyl)-propane, 1,1'-(4,4'-dihydroxy-diphenyl)-1-phenyl-ethane, 2,2-(4,4'-dihydroxy-diphenyl)butane, 2,2-(4,4'-dihydroxy-diphenyl)pentane, 3,3-(4,4'-dihydroxy-diphenyl) pentane, 2,2-(4,4'-dihydroxy-diphenyl)-hexane, 3,3-(4,4'-dihydroxy-diphenyl)-hexane, 2,2-(4,4'-dihydroxydiphenyl)-4-methyl-pentane(dihydroxy-diphenyl)-heptane, 4,4(4,4'-dihydroxy-diphenyl)-heptane, 2,2-(4,4'-dihydroxy-diphenyl)-tri decane, 2,2-(4,4'-dihydroxy-3'-methyl-diphenyl)-propane, 2,2-(4,4'-dihydroxy3-methyl-3'isopropyl-diphenyl)-butane, 2,2-(3,5,3',5',-tetrachloro-4,4'-dihydroxy-diphenyl)-propane, 2,2-(3,5,3',5',-tetrabromo4,4'-dihydroxy-diphenyl)-propane, (3,3'-dichloro-4,4'-dihydroxydiphenyl)-methane and 2,2'-dihydroxy-5,5'-difluoro-diphenyl)methane, (4,4'-diphenyl)-phenyl-methane and 1,1-4,4'-dihydroxydiphenyl-1-phenyl-ethane, and mixtures thereof.

Any suitable catalyst may be used to initiate, promote, or modify the chemical reaction. Typical catalysts include various mineral acids, Lewis acids and organic amine compounds. Organic amines have been found to both act as a catalyst and enter into the reaction and become part of the epoxy silicate resins and foam. Aliphatic and aromatic amines have been found to be most useful. Primary amines are more effective than secondary and tertiary amines and are, therefore, preferred. Optimum results have been obtained with polyfunctional aliphatic amines such as diethylene triamine, since the reaction takes place rapidly at room temperature to form apparently highly cross-linked structures. If desired, complex or adduct amines may be used. Typical amines include methylamine, ethylamine, propylamine, isopropylamine, butylamine, amylamine, hexylamine, aniline, toluidine amine, xylidine amine, phenylenediamine, naphthylamine, benzylamine, ethylenediamine, tetramethylenediamine, pentamethylenediamine, hexamethylenediamine, octamethylenediamine, decamethylenediamine, xylylenediamine, piperazine and other compounds which end with an amine radical, such as aminocaproic acid, alkylene polyamines, vinyl amines, diethylenetriamine, triethylenetetramine, tetraethylenepentamine and mixtures thereof. The polyamine catalyst may first be reacted with dicarboxyl acid and anhydrides to produce polyamide compounds with unreacted amine groups.

Any suitable modifying or additive compounds may be used in the reaction of this invention to vary properties of the product. Typical additives include dicarboxylic anhydrides, di and polyhydroxy compounds, polysulfide polymers, alkali sulfides, sodium polysulfide, aminoplasts, phenoplasts, fatty or rosin acids, furfural-ketone resins, dibutyl phthalate, tricresyl phosphate, polyamides, fatty diamines, styrene oxide, acetonitrile, primary aromatic sulfonamides, secondary aromatic sulfonamides, disecondary sulfonamides, polymerized oils, carbon disulfide, soya bean oil, polyamide resins, Alicyclic anhydrides may be used as curing agents. The OH radicals produced in the chemical reaction of epichlorohydrin with the amine catalyst and silica may be reacted chemically with unsaturated fatty acids, melamine, phenoplast, aminoplasts, methacrylic, furan compounds and other organic compounds.

The epoxy silicate resins may be modified by adding an alkali compound to the mixture of silica, epoxy compound containing a halide and an amine compound. The alkali compound is added in the ratio of about 0.5 to 1 mol per mol of the epoxy compound containing a halide. The alkali compounds include sodium hydroxide, potassium hydroxide, sodium oxide, potassium oxide, sodium silicate, sodium polysulfide, sodium carbonates, potassium carbonates, sodium cyanide, soda, lime, and mixtures thereof.

The reactions of this invention may take place under any suitable physical condition. While many of the reactions will take place acceptably at ambient temperature and pressures, in some cases, better results may be obtained at somewhat elevated temperatures and pressures. Preferable, the reaction takes place at a temperature between 50° C and the boiling temperature of the solution. On the other hand, where the reaction is exothermic, it may be desirable to cool the reaction vessel. With some products, it is desirable to raise the pH after the reaction is complete to at least about 7 to precipitate the polymer.

The exact course of the reactions which take place during the process to produce epoxy silicate resins cannot be determined with 100% certainty. The exact chemical formulae for the epoxy silicate resinous products are not known.

The primary object of the present invention is to produce epoxy silicate resinous products. Another object is to produce epoxy silicate resinous products that may be painted on wood to produce a protective coating. Still another object is to produce epoxy silicate resinous products which can be molded into useful objects with heat and pressure.

DESCRIPTION OF PREFERRED EMBODIMENTS

My invention will be illustrated in greater detail in the specific examples which follow, which detail preferred embodiments of my process. It should be understood that the scope of my invention is not limited to the specific processes set out in the example. Parts and precentages are by weight, unless otherwise indicated.

EXAMPLE I

About 20 parts by weight of silica (SiO$_2$) and 10 parts by weight of diethylenetriamine are mixed, then 40 parts by weight of epichlorohydrin are added slowly, adding about 10 parts by weight at one time while agitating for 5 to 10 minutes at ambient pressure while keeping the temperature below 80° C. The remaining 30 parts by weight are added in the same method as above, thereby producing a thick epoxy silicate resinous liquid. The epoxy silicate resinous liquid is heated to a temperature between 80° to 100° C thereby producing a hard, tan, solid epoxy resinous product.

EXAMPLE II

About 20 parts by weight of fine granular silica, 10 parts by weight of ethylenediamine, 5 parts by weight of sodium carbonate are mixed. About 20 parts by weight of epichlorohydrin are slowly added (about 5 parts at one time) while agitating for about 30 to 40 minutes at ambient pressure and keeping the temperature below 80° C, thereby producing a thick, light gray, epoxy silicate resinous liquid. The epoxy silicate resinous liquid is poured into a container and heated to a temperature between 80° to 100° C thereby producing a tough epoxy silicate resinous product.

The epoxy silicate resinous liquid may be poured into a mold, then heated, thereby producing a hard, tough useful object.

EXAMPLE III

About 20 parts by weight of fine granular silica, 20 parts by weight of diethylene triamine, 10 parts by weight of sodium hydroxide flakes and 20 parts by weight of water are mixed then heated to 80° to 100° C until most of the water has evaporated. About 25 parts by weight of epichlorohydrin is slowly added to the mixture while agitating at ambient pressure. The mixture is then heated to 80° to 100° C thereby producing a gray rubbery epoxy silicate resinous product.

EXAMPLE IV

About 20 parts by weight of fine granular silica, 30 parts by weight of epichlorohydrin and 3 parts by weight of concentrated phosphoric acid are mixed then agitated for 10 to 30 minutes at ambient temperature and pressure thereby producing a mixture of a white epoxy silicate resinous product and silica.

EXAMPLE V

About 20 parts by weight of epichlorohydrin are slowly added to 20 parts by weight of ethylenediamine while agitating for 10 to 30 minutes and keeping the temperature below 70° C; then about 20 parts by weight of fine granular silica are mixed. The mixture is then heated to 80° to 100° C while agitating for 5 to 10 minutes, thereby producing a solid epoxy silicate resinous product.

EXAMPLE VI

About 20 parts by weight of fine granular silica, 10 parts by weight of diethylenetriamine, and 25 parts by weight of epichlorohydrin are mixed for about 10 minutes or until the chemical reaction proceeds rapidly and produces considerable heat. The chemical reaction takes place at ambient temperature and pressure and is complete in 20 to 30 minutes, thereby producing a brown epoxy silicate resinous product.

EXAMPLE VII

About 20 parts by weight of fine granular silica, 20 parts by weight of hexamethylenediamine and 30 parts by weight of epichlorohydrin are mixed then agitated at ambient temperature and pressure for 20 to 30 minutes, thereby prouducing a gray solid epoxy silicate resinous product.

EXAMPLE VIII

About 20 parts by weight of fine granular silica, 10 parts by weight of diethylenetriamine, 10 parts by weight of Bisphenol A epoxy resin, and 10 parts by weight of epichlorohydrin are mixed then heated to about 40° C for 10 to 30 minutes, thereby producing a cream colored soft epoxy silicate resinous product.

EXAMPLE IX

About 20 parts by weight of fine granular silica, about 3 parts by weight of ethylamine, and about 30 parts by weight of epichlorohydrin are mixed, then heated to about the boiling temperature of the mixture while agitating at ambient pressure for 20 to 30 minutes, thereby producing an epoxy silicate resinous product.

EXAMPLE X

About 20 parts by weight of fine granular silica, 15 parts by weight of p-aminobenzoic acid and 30 parts by weight of epichlorohydrin are mixed, then heated to just below the boiling point of epichlorohydrin while agitating at ambient pressure for 20 to 30 minutes, thereby producing a grayish tan solid epoxy silicate resinous product. The resinous product may be molded into useful products with heat and pressure.

EXAMPLE XI

About 20 parts by weight of fine granular silica, 20 parts by weight of caprolactam and about 30 parts by weight of epichlorohydrin are mixed, then heated to about the boiling temperature od epichlorohydrin while agitateng at ambient pressure for 10 to 20 minutes, then heated to about 150° C for about 10 to 20 minutes, thereby producing a solid epoxy silicate resinous product. The resinous product may be molded into useful objects by heat and pressure.

EXAMPLE XII

About 20 parts by weight of fine granular silica, 20 parts by weight of triethylenetetramine, 10 parts by weight of granular sodium metasilicate pentahydrate and 30 parts by weight of epichlorohydrin are mixed then agitated for about 10 to 30 minutes, thereby producing a cream colored, epoxy silicate rubbery product.

EXAMPLE XIII

About 20 parts by weight of fine granular silica, 20 parts by weight of 1,6-hexanediamine and 20 parts by weight of epichlorhydrin are mixed then heated to 45° to 70° C while agitating at ambient pressure for 20 to 30 minutes thereby producing a liquid epoxy silicate resinous product.

The liquid resinous product is thermoplastic and may be poured into a mold then heated to 80° to 100° C thereby forming useful solid objects in a short period of time.

EXAMPLE XIV

About 20 parts by weight of fine granular silica, 10 parts by weight of ethylene diamine and 20 parts by weight of 1,2-epoxypropane are mixed and agitated at ambient pressure and temperature for 10 to 30 minutes thereby producing an epoxy silicate resinous product.

EXAMPLE XV

About 20 parts by weight of fine granular silica, 20 parts by weight of diethylenetriamine, 10 parts by weight of sodium hydroxide flakes and 50 parts by weight of water are mixed then heated to 80° to 100° C while agitating at ambient pressure until most of the water is evaporated. About 25 parts by weight of epichlorohydrin are slowly added to the mixture while agitating for 10 to 30 minutes. The mixture is then heated to about 80° to 100° C thereby producing a gray, rubbery epoxy silicate resin.

EXAMPLE XVI

About 20 parts by weight of a fine granular silica, 20 parts by weight of epoxized castor oil, and 20 parts by weight of ethylenediamine are mixed, then 25 parts by weight of epichlorohydrin are slowly added to the mixture while agitating and keeping the temperature below 70° C thereby producing a thick liquid epoxy silicate resinous product. The product is cured to a tough solid resin by heating it to 80° to 100° for a short period of time (1 to 10 minutes).

EXAMPLE XVII

About 10 parts by weight of sodium hydroxide flakes are mixed with 10 parts by weight of sulfur then heated to above the melting point of sulfur while agitating for 10 to 20 minutes. About 20 parts by weight of fine granular silica, 20 parts by weight of an amino-terminated polymerized oil resin, and 20 parts by weight of water are mixed with said mixture then about 30 parts by weight of epichlorohydrin are slowly added while agitating at ambient temperature and pressure thereby producing a yellow, rubbery solid resin.

EXAMPLE XIX

About 10 parts by weight of maleic acid and 15 parts by weight of diethylenetriamine are mixed, then about 20 parts by weight of fine granular silica are added to the mixture. About 30 parts by weight of bisphenol A epoxy resin with 2 or more reactive epoxy groups per molecule are added. Then the mixture is heated to about 70° C thereby producing a hard, solid cream colored epoxy silicate resinous product.

EXAMPLE XX

About 20 parts by weight of a fine granular silica, about 20 parts by weight of ethylenediamine, and 5 parts by weight of sodium hydroxide flakes are mixed then heated to just below the boiling point of ethylenediamine for 20 to 40 minutes at ambient pressure thereby producing an aminosilicate compound. Then 10 parts by weight of epichlorohydrin and 20 parts by weight of an epoxidized unsaturated fatty acid are added and the temperature is kept below 70° C while agitating at ambient pressure for 20 to 30 minutes. The mixture is then heated to 80° to 100° C thereby producing a tough solid epoxy silicate resinous product.

Although specific materials and conditions were set forth in the above Examples, these were merely illustrative of preferred embodiments of may invention. Various other compositions, such as the typical materials listed above, may be used where suitable. The reactive mixtures and products of my invention may have other agents added therefore to enhance or otherwise modify the reactions and products.

Other modifications of my invention will occur to those skilled in the art upon reading my disclosure. These are intended to be included within the scope of my invention, as defined in the appended Claims.

I Claim:

1. The process for the production of epoxy silicate resinous products by the following steps:
   (a) adding about 20 parts by weight of a fine granular silica (SiO$_2$);
   (b) mixing therewith a catalytic amount of an organic amine compound;
   (c) mixing therewith 10 to 30 parts by weight of an organic epoxy compound having at least one epoxy group;
   (d) agitating the mixture until the resulting chemical reaction is complete.

2. The process according to claim 1 wherein the organic epoxy compound is selected from the group consisting of epichlorohydrin, glycidol, methyl epichlorohydrin, 1,2-epoxybutane, 1,2-epoxypropane, 1-chloro-2,3-epoxypropane, 1:2,3:4-diepoxybutane, 2:3,6:7-diepoxy-2,6-dimethyl-4-octene, epoxyethylbenzene, and mixtures thereof.

3. The process according to claim 1 wherein the amine catalyst is an organic amine selected from the group consisting of primary aliphatic and aromatic amines.

4. The process according to claim 1 wherein the organic epoxy compound is epichlorohydrin.

5. The process according to claim 1 wherein the amine catalyst is added to the silica prior to the addition of said organic epoxy thereto, and said epoxy compound is added in steps of about 10 to 20 weight percent of the total epoxy compound while allowing the reaction following each addition of the next step.

6. The process according to claim 1, including the further step of adding an alkali compound selected from the group consisting of sodium hydroxide, potassium hydroxide, sodium carbonate, and potassium carbonate with the said organic amine catalyst in the proportion of 1 to 2 mols to each 2 mols of the halide present in the epoxy compound.

7. The process according to claim 1 wherein the mixture is maintained at a temperature between ambient temperature and 100° C.

8. The process according to claim 1 wherein the epoxy compound is an epoxy resin containing 2 or more reactive epoxy groups per molecule.

9. The process according to claim 8 wherein the epoxy resin is produced by reacting epichlorohydrin with a di(mono-hydroxy) alkane to produce an epoxy resin containing 2 or more reactive epoxy groups per molecule.

10. The process according to claim 1 wherein the epoxy compound is epichlorohydrin and an epoxized unsaturated vegetable oil such as castor oil in the ratio of 1 part by weight of epichlorohydrin to 0.5 to 2 parts by weight of epoxized unsaturated vegetable oil.

11. The process according to claim 1 wherein the epoxy compound is a mixture of epichlorohydrin and an epoxidized unsaturated fatty acid, in the ratio of 1 part by weight of epichlorohydrin to 0.5 to 2 parts by weight of the epoxidized unsaturated fatty acid.

12. The process according to claim 1 wherein the epoxy compound is epichlorohydrin and an epoxidized polyhydroxy compound in the ratio of 1 part by weight of the epichlorohydrin to 0.5 to 2 parts by weight of the epoxidized polyhydroxy compound.

13. The process according to claim 1 wherein the epoxy compound is epichlorohydrin and an epoxidized olefin compound in the ratio of 1 part by weight of the epichlorohydrin to 0.5 to 2 parts by weight of the epoxidized olefin compound.

14. The process according to claim 1 wherein the silica is first reacted with the amine catalyst in step (b) by the following steps:
   (a) 20 parts by weight of a fine granular silica, 10 to 20 parts by weight of an amine selected from the group of polyamines consisting of phenylenediamine, ehtylenediamine, tetramethylenediamine, pentamethylenediamine, hexamethylenediamine, octamethylenediamine, decamethylenediamine, xylylenediamine, piperazine diethylenetriamine, tetraethylenepentamine, tetrametylenediamine, and mixtures thereof, and 5 to 10 parts by weight of sodium hydroxide are mixed then heated to just below the boiling temperature of the amine for 20 to 40 minutes, thereby prouducing an aminosilicate compound.

15. The process according to claim 1 wherein the amine catalyst is replaced with polyamide catalyst and contains 2 or more reactive amine groups per molecule.

16. The product produced by the process of claim 1.